(12) United States Patent
Huettner et al.

(10) Patent No.: US 9,073,698 B2
(45) Date of Patent: Jul. 7, 2015

(54) TRANSPORT SECTION OF A HORIZONTAL CONVEYOR DEVICE WITH AT LEAST ONE ADJUSTABLE GUIDE ELEMENT

(71) Applicant: KRONES Aktiengesellschaft, Neutraubling (DE)

(72) Inventors: Johann Huettner, Mallersdorf-Pfaffenberg (DE); Martin Seger, Neumarkt i.d. Oberpfalz (DE); Peter Muehlstein, Koefering (DE)

(73) Assignee: Krones Aktiengesellschaft, Neutraubling (DE)

( * ) Notice: Subject to any disclaimer, the term of this patent is extended or adjusted under 35 U.S.C. 154(b) by 0 days.

(21) Appl. No.: 14/319,337

(22) Filed: Jun. 30, 2014

(65) Prior Publication Data

US 2015/0008099 A1    Jan. 8, 2015

(30) Foreign Application Priority Data

Jul. 4, 2013    (DE) .......................... 10 2013 107 038

(51) Int. Cl.
    *B65G 21/20*    (2006.01)
(52) U.S. Cl.
    CPC ........ *B65G 21/2072* (2013.01); *B65G 21/2063* (2013.01)
(58) Field of Classification Search
    CPC ....................... B65G 21/2072; B65G 21/2063
    USPC .......................................... 198/836.3, 836.1
    See application file for complete search history.

(56) References Cited

U.S. PATENT DOCUMENTS

| | | | | |
|---|---|---|---|---|
| 5,211,280 A | * | 5/1993 | Houde | 198/836.3 |
| 5,291,988 A | * | 3/1994 | Leonard | 198/836.3 |
| 6,050,396 A | * | 4/2000 | Moore | 198/836.3 |
| 6,209,707 B1 | * | 4/2001 | Ronchi | 198/445 |
| 8,464,864 B2 | | 6/2013 | Bell et al. | |
| 8,490,780 B2 | * | 7/2013 | Bell et al. | 198/836.3 |
| 8,695,787 B2 | * | 4/2014 | Bell et al. | 198/836.3 |
| 2005/0217974 A1 | | 10/2005 | Huttner | |
| 2011/0079493 A1 | | 4/2011 | Bell et al. | |

FOREIGN PATENT DOCUMENTS

| | | |
|---|---|---|
| DE | 20208127 | 1/2003 |
| DE | 202005001689 | 9/2005 |
| EP | 0962406 | 12/1999 |
| WO | WO2007102917 | 9/2007 |

* cited by examiner

*Primary Examiner* — Leslie A Nicholson, III
*Assistant Examiner* — Keith R Campbell
(74) *Attorney, Agent, or Firm* — Davidson, Davidson & Kappel, LLC

(57) ABSTRACT

A transport section of a horizontal conveyor device for conveying articles moved along in a standing or hanging position on a transport support surface extending in a horizontal conveying direction between two guide elements arranged approximately in parallel to each other and spaced from each other at a distance corresponding to at least the article or container width. At least one of the two guide elements arranged facing each other is adjustable in its distance to the other of the guide elements and transverse to the conveying direction via several adjustment elements attached to a machine frame or base frame. The adjustment elements are coupled with each other via a common rotary drive and are approximately synchronized and each adjustment element transmits a rotatory drive of the common rotary drive via one or more transmissions to a linear adjustment movement of the guide element linked to it.

16 Claims, 7 Drawing Sheets

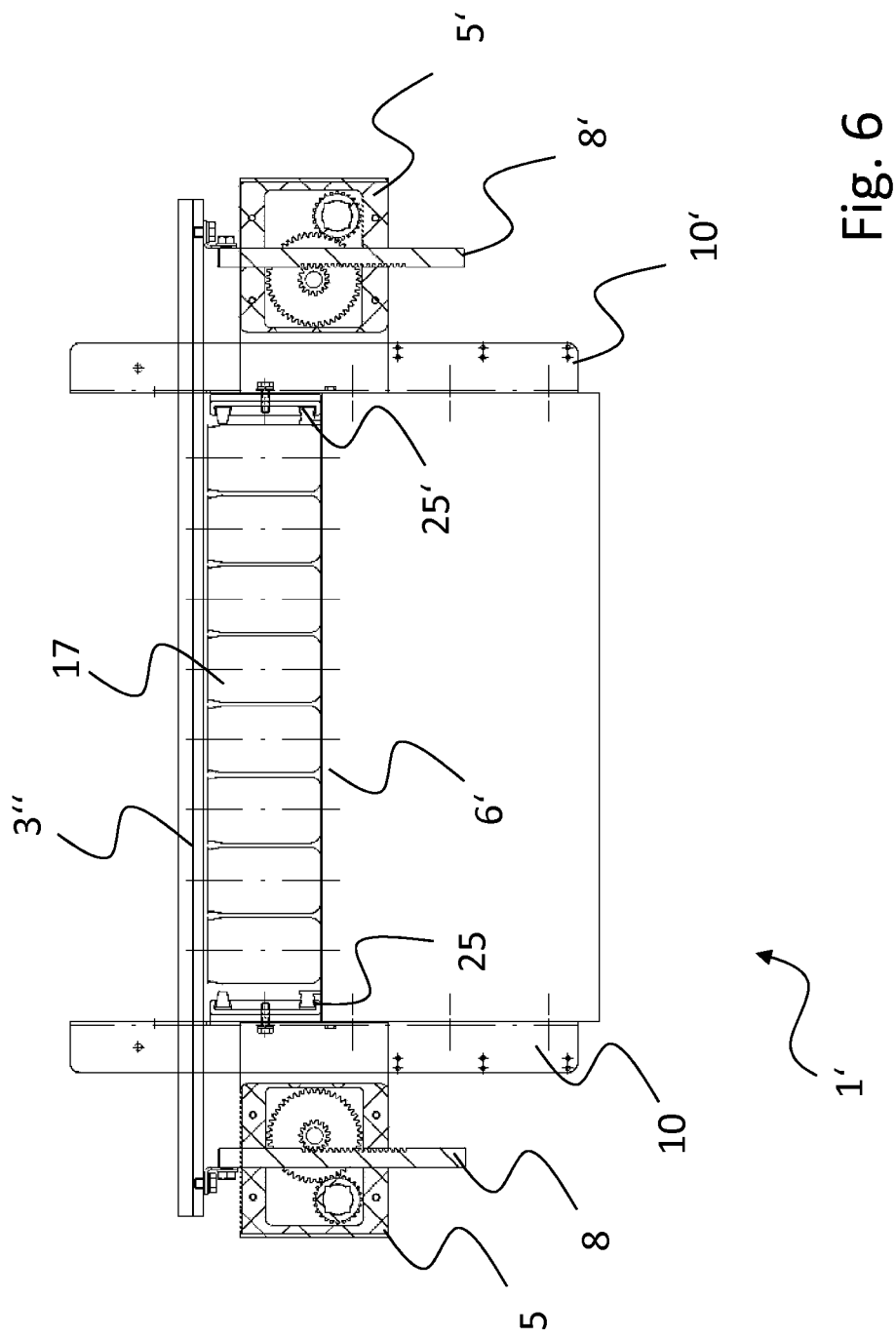

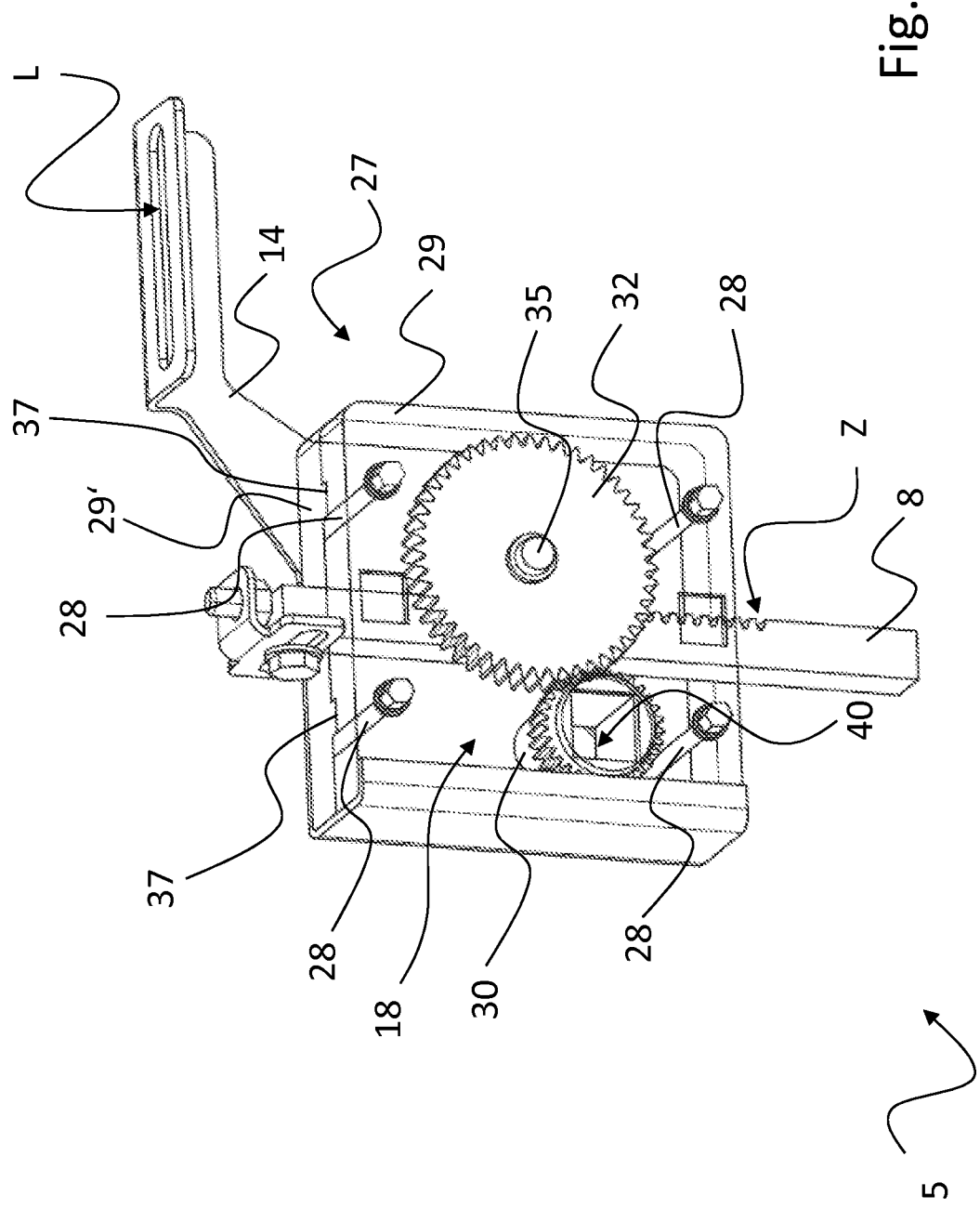

TRANSPORT SECTION OF A HORIZONTAL CONVEYOR DEVICE WITH AT LEAST ONE ADJUSTABLE GUIDE ELEMENT

This claims the benefit of German Patent Application DE 10 2013 107 038.8, filed Jul. 4, 2013 and hereby incorporated by reference herein.

The present invention relates to a horizontal transport section with at least one adjustable guide element.

BACKGROUND

There are various embodiment variants of transport sections already known from prior art, which are intended for conveying articles from one first processing machine toward another processing machine. Transport sections may also be intended for removing articles out of a processing machine, feeding articles into a processing machine, or transporting or conveying articles from one location to another. While being conveyed over the transport section, the respective articles are moved and directed along a desired path of transport. For this purpose, these embodiments frequently include one or more guide elements following the transport path with the articles being guided past the said guide elements.

Such guide or conduction elements may be formed by rods, panels, or the like. The respective articles being conveyed have surface contact with the guide elements during movement and they are directed in their tracks by the guide elements. In order to prevent article jams and/or disorientation of the articles, the respective articles can glide along the guide elements with the least possible friction.

In addition to directing the articles, the guide elements are also intended for preventing instabilities during article transport. For this purpose, there are guide elements known from prior art that extend vertically so that the articles being guided over the transport section are enabled to come into a planar contact, thus ensuring stable conveyance.

If it is intended to pass articles of a first geometry through the transport section and afterwards, or at another point of time, articles of a different, second geometry, an adjustment of the position of the respective guide element or elements involved is necessary for ensuring stable guidance. Such adjustment procedures may be needed, in particular, if containers of a first filling volume are to be transported first and subsequently containers of a second filling volume, wherein the containers each differ in their external shapes and/or external dimensions.

In such adjustment procedures, the position of the guide elements must be adjusted in such a way that the distance between two guide elements is slightly greater than the article width or height so as to enable the articles to be guided over the transport section between the respective guide elements without jamming. By this distance it must furthermore be ensured that the articles are prevented from tipping over and that defined tracks in the transport section are adhered to as exactly as possible. These requirements demand a very precise adjustment of the position of each of the guide elements.

In prior art, the adjustment of the position can be effected by manually adjusting or repositioning the respective guide element or elements. Such a manual adjustment procedure or manual repositioning of guide or conduction elements, possibly involving the use of tools, is cumbersome and very time consuming, which is why alternative mechanisms have been developed to simplify the repositioning procedure. Collapsible railings or eccentric discs are among the adjustment means as known from the prior art.

Another option, involving the use of a crank for adjustment of guide elements, is disclosed in U.S. Pat. No. 5,211,280 A. In this setting apparatus, the rotary movement of a shaft, which is driven by a manual crank, is transmitted to a gear rack that moves the respective guide element. Also described is a rotary knob for fixing a reached position, by means of which the guide element can be held in the respective position. If the guide element needs readjusting, the rotary knob and hence the clamping in place is loosened and the manual crank is then used to adjust the guide elements. In this known device, the gear rack is directly linked to a shaft having an external tooth system for intermeshing in a comb-like engagement with the gear rack.

In the direct transmission of torque from the drive shaft with external teeth on the gear rack as shown in U.S. Pat. No. 5,211,280 A, it is possible that the guide elements are adjusted too far or too close. In particular in manual adjustment, such an adjustment mechanism is of only limited precision so that under unfavorable circumstances adequately exact adjustments of the respective guide elements cannot be performed and the required precise positions of the guide or conduction elements cannot be ensured.

With respect to the present invention, however, mechanisms are desirable that allow an easy manner and a large degree of accuracy for positioning guide elements when adjusting them. A further problem in practice is that the respective guide elements suffer wear and tear after a certain time, thus making readjustment of the guide elements necessary in order to counteract the signs of wear and in order to be able to transport the respective articles stably and abutting on the respective guide elements. This type of readjustment also requires mechanisms permitting very precise fine adjustment of the position of the respective guide elements.

SUMMARY OF THE INVENTION

It is an object of the present invention to provide a transport section that allows adjusting the position of guide elements as precisely as possible. In addition, the object of the present invention lies in providing such a transport section that allows performing the adjustment of guide elements in an easy and uncomplicated manner.

The present invention provides a transport section having a horizontal conveyor device for conveying articles such as liquid containers or bottles. The articles can take the form of PET containers that are stretch blow molded from preforms and/or the form of glass containers and/or other liquid containers. It is also conceivable that the articles or liquid containers or bottles are passed through the transport section assembled in bundles. Besides, the transport section according to the invention is suitable for conveying other articles such as bulk goods or the like. It is therefore explicitly pointed out here that the term "article" as used in the present context is to be understood in a comprehensive sense and can refer both to individual containers, items, or bulk good items as well as to packages, bundles, or other article compilations that are conveyed along a set transport path by a horizontal conveyor device.

The articles are moved along in a standing or hanging position on a transport support surface extending in a horizontal conveying direction between two guide elements arranged approximately in parallel to each other. Here, the said guide elements have to be spaced apart at a distance corresponding at least to the article or container width so that the said articles cannot jam between the guide elements running approximately in parallel along the transport path. As the case may be, the two guide elements can be provided to comprise an article guidance profile on their respective side facing toward the articles.

The articles can be moved along optionally one after the other in one row or also standing one behind the other in several parallel rows. If the articles are moved in several rows, then the articles in a first of the several rows may be moved along in parallel to articles in the second row. This invention is, however, not restricted to such embodiment forms and it may thus furthermore be provided that the articles are moved along, at least in sections, for instance in a mass flow while being conveyed over the transport section so that it is not necessary to have a precise sequence of several parallel rows of consecutively conveyed articles, but it is rather allowed for a disorderly article sequence at least in certain sections.

Furthermore, the transport support surface can be designed to be stationary. In this case, the articles can glide along on the transport support surface. The transport support surface can be fixedly connected with a machine frame and/or a base frame of the transport section in this embodiment form. A machine frame and/or a base frame may comprise a support or several supporting legs for supporting the respective machine frame and/or base frame on the floor surface.

It should be noted here that the term "horizontal conveyor device" is used in a comprehensive sense to mean that the said conveying device may, at least in sections, slope upward or downward. Provided that these up- or downwardly sloping sections do not lead to the articles shifting or to no longer being conveyable in the desired order, the said sloping sections do not constitute any limitation to the function of this invention. This means that conveying devices that move articles along at different levels of height can be understood and considered as horizontal conveyor devices in the sense of the present invention.

In further embodiment forms it may be additionally provided that the transport support surface is designed as a part of a circulating conveyor belt on which the articles or containers or bottles either stand or from which they are suspended, such embodiments including, in particular, an air conveyor. There are also further possibilities for conveying articles, for instance a chain guide with circumferentially arranged support rods, such as are known to the expert and need no explicit specification. With regard to the mentioned conveying variants, the remarks above apply and said variants may optionally run horizontally or be designed to have minor up- or downward slopes.

As mentioned and as provided according to the present invention, two guide elements are arranged approximately in parallel to each other. In so far as the articles are moved along in a linear manner in a part of the transport section, both guide elements in this first part are of linear extension, i.e., they run in a straight line and have an approximately parallel orientation in relation to each other throughout the entire first part. If the guide elements direct the articles along a curved path in any part, both guide elements are also oriented approximately parallel in relation to each other in this part. Basically, it would also be conceivable for the articles to be guided only along the outer side of a curved path so that in such sections a guide element is not needed on the inner side of such curve, as the case may be. This would, however, require that the articles glide largely without friction along the guide element on the outer side of the curve in order to prevent displacement of individual articles being conveyed in sequence and any associated malfunction in the article transport; hence guide elements should normally also be provided on the inner side of curves in curved transport sections, with said guide elements each expediently comprising the aforementioned approximate parallel position to the guide elements on the outer side of said curves to ensure faultless guiding and directing of the transported articles over the entire length of the respective transport section.

The two guide elements must be spaced apart at a distance corresponding at least to the width of the articles or containers so that these can be guided along with little play and without the risk of jamming. The distance between the guide elements is preferably selected to exceed the article or container width by 2 to 5 millimeters. Embodiment forms are conceivable in this context in which a single row of consecutively arranged articles or containers are conveyed in a standing position between the two guide elements. In such cases, the relative distance of the guide elements may be slightly greater than the maximum article or container diameter because a little play does not negatively affect precise guidance of the articles. For some articles, such as PET containers with beverages in them, it may even be necessary to provide adequate lateral play between the container surfaces and the respective guide elements because such relatively thin-walled containers are flexible and yield to pressure, thus leading to an external shape that is not precisely definable and making some play for guiding between them and the parallel guide or conduction elements necessary.

In other embodiment forms it is conceivable that a separating device, such as a partition wall, one or more separating rods, a kind of lane plate and/or the like extend approximately in parallel to the two guide elements. The first articles here could be conveyed standing behind one another in a row between the partition wall and one of the two guide elements. Second articles could then be conveyed standing behind one another in a row between the partition wall and the other of the two guide elements. One or both of the guide elements could be designed to be adjustable, as the case may be. In this instance, the two rows would be conducted in parallel to one another. The relative distance between a first of the two guide elements and the separation device could be designed to be greater or smaller in relation to the distance between the other one of the two guide elements and the separation device. The first articles or containers could have a different maximum diameter to that of the other articles or containers. The articles could also be previously sorted according to their maximum article diameter prior to entering the transport section.

Furthermore, at least one of the two guide elements arranged facing each other is adjustable in its distance to the other guide element and in transverse to the conveying direction by means of several adjustment elements attached to the machine frame or base frame. Optionally, only two adjustment elements can be associated with each guide element in this case; however, more than two adjustment elements are provided for each of the adjustable guide elements in preferred embodiment forms. The distance between the adjustment elements along the transport section is preferably between 30 and 100 centimeters in this case and particularly preferably approximately 50 centimeters.

The adjustment elements are coupled with each other via a common rotary drive and are approximately synchronized. Activation of the first adjustment element can be performed approximately simultaneously with the activation of the respective further adjustment elements. The respective guide element can thus be adjusted at least approximately simultaneously by all the adjustment elements associated with it. The adjustment elements can be activated at least approximately synchronized for adjusting the guide element.

It is also conceivable that each of the adjustment elements effects an adjustment of the guide element by a defined distance when adjusting the said guide element. It is possible to have the respective adjustment elements perform repositioning of the respective guide element with the identical adjustment distance and each activated synchronously. It is for example conceivable for a rotary drive to be driven either manually or mechanically. The rotary drive could thus be designed as a manual crank, for instance, which is coupled to the respective adjustment elements. Other embodiment forms may conceivably possess a rotary drive in the form of an electric motor, a hydraulic motor and/or a servomotor of nearly any kind.

It is furthermore provided that each adjustment element transmits a rotatory drive of the common rotary drive via one or more transmissions to a linear adjustment movement of the guide element linked to it. The linear adjustment movement can be oriented at least approximately in parallel to the transport support surface. The adjustable guide element can be linked to the respective adjustment elements by means of screw connections, for instance, or also by latch and/or snap-lock and/or clamp connections. There are also other preferred embodiment forms for the connection between the respective adjustment elements and their associated guide elements, which will be described in detail below.

On activating the rotary drive, the transmission and the resultant linear adjustment movement of the respective adjustment elements permit very precise adjustment of the respective position of the adjustable guide element. According to the design of the transport section and the desired sensitivity of adjustment, a multitude of transmissions in various embodiment forms are conceivable for the present invention. It is useful for the one or more of the transmissions to comprise at least two counter-rotating gear wheels and/or a shaft with an external gear tooth system and a gear wheel turning in the reverse sense to shaft rotation and intermeshing comb-like with the external teeth. Here, the rotational frequency of the driving gear wheel or the driving shaft with external gear teeth can be greater than the rotational frequency of the output gear wheel.

In particularly preferred embodiment forms, the one or more transmissions of the adjustment elements each comprise at least one input means with external teeth and a first number of teeth n1, said input means being coupled with and rotatably drivable via the rotary drive. As previously mentioned, the input means can be designed as a gear wheel. It is furthermore conceivable that the input means is designed as a rotary shaft with external teeth. The input means may also be designed as gear wheel, which is torque-proofly attached to a drive shaft.

Further it is possible to provide for the one or more transmissions of the adjustment elements to comprise at least one transmission means with external teeth and a second number of teeth n2, said transmission means being arranged downstream of the input means and designed to intermesh comb-like with the input means. The ratio of the first number of teeth n1 of the input means to the second number of teeth n2 of the transmission means is reasonably formed to be less than 1. In particularly preferred embodiments of the present invention, the second number of teeth n2 of the transmission means is at least 1.5 times the number of teeth of the input means. In practice, such embodiment forms have proven successful wherein the transmission means has a number n2 of twice as many teeth or more than the input means with a first number of teeth n1.

In order to transmit the linear adjustment movement to the adjustable guide element, it is possible to provide for the adjustment elements to each comprise at least one gear rack and for the transmissions to each possess at least one output means designed as rotary gear wheel, said output means intermeshing toward the linear adjustment movement of the gear rack in a comb-like engagement with the at least one gear rack. The gear rack can for instance be brought into a direct engagement with the previously mentioned transmission means. The gear racks of the respective adjustment elements preferably extend lengthwise in a parallel orientation with the transport support surface and in perpendicular to the extension of the guide element so that the movement path of the gear racks and their longitudinal extension directions extend in an approximately horizontal plane. It is furthermore possible that the gear rack is toothed only in defined sections and not along its entire longitudinal extension. The forward and return stroke of the gear rack in a linear adjustment movement can thus be limited according to requirements. In addition, it is possible by means of the tooth system of the translationally movable gear rack to predefine adjustment stop positions in defined sections.

Various embodiment forms may provide at least two gear racks associated with one or more adjustment elements, said gear racks being guided in parallel and in opposite directions on activating the adjustment element. In each case one of the gear racks can be designed for adjusting an own guide element. Both gear racks can intermesh in a comb-like engagement with the previously mentioned output means designed as gear wheel. In this manner it is possible to use one of the adjustment elements to perform respectively reverse sense movements of the parallel guide elements because two parallelly arranged gear racks, both of them intermeshing comb-like with the same gear wheel, each perform translational movements in a reverse sense on rotating the gear wheel. In this instance, the moving sections of the gear racks have to be connected with the movable guide elements by an appropriate rod deflection or an appropriate suspension, as the case may be, because the gear racks have to be placed above or below the article movement path in order to avoid collisions with the horizontal conveyor device and/or with the articles in these instances.

In preferred embodiment forms, the output means designed as a rotary gear wheel and the transmission means are coupled with each other in a torque-proof connection wherein these parts have a common rotation axis. The transmission means and output means coupled torque-proofly thereto can then be torque-proofly arranged on a common shaft or form an integral part of this common shaft.

Various embodiment forms may also provide that several components of the transmissions, which are brought into engagement with each other, are made of different materials. At least one first component can be made of a synthetic material, for instance, while at least one second component engaging with the first component can be made of metal. Such designs require no or only small amounts of lubrication to ensure that the function of the transmissions causes minimal wear and tear. It is conceivable for the previously described input means to be made of a synthetic material, for instance, and the transmission means intermeshing with the said input means to be made of metal. It is alternatively conceivable for the input means to be made of metal and the transmission means intermeshing with the said input means to be made of a synthetic material. Other embodiment forms can have several transmissions intermeshing with each other, each made of different synthetic materials. These material pairings can expediently be selected by the criterion of adequate self-lubrication, as such differing materials with varying degrees of hardness and different wear and tear behavior can be advantageously combined and brought into a comb-like engagement without additional lubricant being needed. If lubrication of individual gear components is necessary, however, then it may be provided that lubricant is applied to the gear rack and passed on from there to other gear components.

Provisions may further be made for at least one output means designed as rotary gear wheel to comprise a third number of teeth n3, with n3 being smaller than the number of teeth n1 of the input means. The output means designed as rotary gear wheel can reasonably comprise a third number of teeth n3, with n3 being smaller than the number of teeth n2 of the transmission means. It is thus possible to provide a further transmission level by the transmission means and the output means designed as gear wheel with a low number of teeth.

With regard to the first number of teeth n1 of the input means, the second number of teeth n2 of the transmission means, and the third number of teeth n3 of the output means designed as gear wheel, the following may apply: $n3<n1<n2$.

Since the output means designed as gear wheel is torque-proofly coupled with the transmission means and possibly comprises a common shaft for this purpose, both the output means designed as gear wheel and the transmission means may have the identical rotational frequency when making an adjustment. Due to transmission, the rotational frequency of the input means is then greater than the rotational frequency of the transmission means and of the output means that is torque-proofly coupled with the transmission means. The proposed transmissions enable highly sensitive adjustments of the respective adjustable guide means.

To protect the transmissions to a great extent against contamination, the adjustment elements can each be provided with a casing comprising at least two parts for fully accommodating the transmissions. Like the components of the gearing, the casing may also be made of a synthetic material or metal, for instance. Each first part of the casing can possess one or more grooves and the respective second part of the casing one or more projections formed to correspond to the grooves and to form-lockingly engage with the grooves of the respective first part when the first and second parts are connected. The grooves of each first part and the thereto correspondingly formed projections of the respective second part can be designed for a mating alignment of each first part when placed onto the respective second part. Accordingly, the first part can possess at least two grooves, which at least two correspondingly formed projections of the respective second part engage with. The projections may thus be formed by dowel pins, which form-lockingly engage with the respective grooves.

The grooves can be arranged on the side of the edges in the respective first part. It is also possible for the projections of each second part to be designed so as to protrude from the side of the edges from the respective second part facing in the direction of the respective first part. If the casing is made of a synthetic material, the grooves and projections can be produced in one part in an injection molding process together with the respective casing half so that the at least two casing halves can be matingly aligned economically and easily without any further resources being required.

In general, however, other variants for a form-locking fit are also possible, for instance separate dowel pins or the like, which can provide precise orientation and alignment of the two casing halves.

In order to connect the halves of the at least two-part casing, possibly after matingly aligning them, it may be provided for the first part and the second part to comprise at least one recess each, which recesses align with one another when the first and the second part are connected.

It is possible to use the recesses in the first and the second part for connecting each first part with the respective second part by inserting fixation means, such as screw connections or rivets, through them. Connection is also possible by means of latches, snap locks, or arrestor clips. If the previously mentioned advantageous mating alignment of each first part with the respective second part is achieved by using grooves and projections, it is possible that the at least one recess of the first part and the at least one recess of the second part are aligned with each other after the mating alignment such that the respective fixation means can be inserted through the recesses easily and without requiring any further aligning. The first and the second part of the at least two-part casing can each have exactly one recess, for instance. In preferred embodiment forms, the first part and the second part each possess at least two, preferably each four recesses, which align with each other pairwise when the first part and the second part are in mating alignment. A fixation means, for instance a screw connection, can be inserted through each of the pairwise aligned recesses.

Additionally, the at least two-part casing can be provided with at least one bearing for the input means and/or the transmission means and/or the gear rack and/or the output means designed as gear wheel. The casing can, for instance, form a reception on each of two opposing sides for receiving the gear rack, through which receptions the gear rack is inserted and supportingly held at the casing. These bearings can be formed as a component of the casing and be produced together with the casing in an injection molding process. As previously mentioned, the input means and/or the transmission means and/or the output means designed as gear wheel can be positioned on a shaft or rotatably journaled about a shaft. The casing can form one or more bearing rings, for instance, which each extend around a shaft and hold the respective shaft at the casing so that the shaft is rotatable about its longitudinal axis. As is clear from the above description, these shaft bearings are each formed as plain bearings for the gear wheels or the transmission means wherein the casing halves can each comprise integrally formed bearing shells or bearing seats. Additional bearing seats or bearing shells that are, for instance, subsequently inserted into the casing halves are usually not necessary, can however be present if they prove to be useful for the benefit of a service life that is as long as possible and for a high resistance to wear.

It may furthermore be provided that the casing forms a preferably circular aperture in the area of the bearing ring or rings formed for holding the shaft of the input means, with a rotating actuating link for the respective adjustment element being inserted through the said circular aperture. The actuating link can be coupled with the input means and formed for rotatingly driving the input means. The actuating link can, for instance, form-lockingly insert through the respective input means. For this purpose, the input means can have a recess, through which the actuating link is form-lockingly inserted. It is conceivable in particularly preferred embodiment forms for the actuating link to be formed, at least in sections, with a polygon or elliptical profile and for the recess of the input means to form-lockingly receive the at least sectionwise polygon or elliptical profiled actuating link. The actuating link can have an at least sectionwise square profile, for instance.

If the output means designed as gear wheel and the transmission means are torque-proofly coupled with a common shaft, the common shaft may be associated with one or more bearing rings of the casing. The bearing rings, which the at least two-part casing preferably forms, allow a simple type of bearing for the shafts of the respective transmissions without requiring any further fixation. The bearing rings can also by used very generally as bearing seats.

Embodiment forms have proven particularly successful with the first part of the casing forming at least one first bearing ring and the second part of the casing forming at least one second bearing ring wherein the at least one first bearing ring and the at least one second bearing ring are aligned with each other when the first and the second casing part are connected. Here, the at least one first bearing ring and the therewith aligned at least one second bearing ring can together rotatably hold a shaft that is provided as a component of the transmissions.

It may also be provided that a bearing ring of the first casing part and a bearing ring of the second casing part is associated with each of the shafts that are provided as components of the transmissions.

In addition, it can be provided for the casing to possess one or more openings on its underside, through which openings a liquid medium can be discharged from the inside of the casing to the outside. It has been shown in practice that during cleaning procedures, which expose the transport section according to the invention or parts of the transport section according to the invention to a liquid, it cannot always be completely avoided that the respective liquid enters into the casing. The proposed embodiment form provides a simple possibility for minimizing the risk of impaired function and corrosion of transmission components arranged inside the casing because, in the instance of entering the casing, the liquid medium can only come into contact with the respective components for a short time before it is discharged from the casing through the one or more openings.

The first part of the casing can form at least one first pocket and the second part of the casing can form at least one second pocket, for instance, in order to form the one or more openings. Each pocket of the first casing part can form one opening each with the respective pocket of the second casing part. The pockets can be produced in one part together with the respective casing part in an injection molding process so that the one or more openings are formed after mating alignment of the first casing part with the second casing part. Additionally drilled holes in the casing for discharging the liquid are not required in this embodiment form. The casing can alternatively or additionally comprise one or more lateral openings, which can also be provided for the discharge of a liquid medium.

Preferred embodiment forms can, in addition, be provided with a common and rotating actuating link to bring all adjustment elements provided for adjusting the respective guide element into an operative connection with the respective rotary drive. The actuating link can take the form of a shaft that is coupled with the rotary drive. If, as previously described, the adjustment elements comprise a gear rack, the forward and return stroke movement of the gear rack, on adjustment of the respective guide element, can be performed essentially in perpendicular to the extension of the actuating link formed as shaft.

In preferred embodiment forms it is additionally conceivable that the actuating link is directly coupled with an input means of the transmissions. The actuating link can, for instance, be form-lockingly accommodated by the respective input means, without requiring any further connections for coupling the respective adjustment elements with the respective actuating link Here, embodiment forms have proven particularly successful wherein the actuating means or the actuating means formed as shaft has a polygon, elliptical, or square profile.

The coupling of the respective adjustment elements by a common, rotating actuating link might pose problems without the one or more transmissions of the transport section according to the invention. Due to a momentum transmitted from the rotary drive to the respective actuating link and due to the resistances acting on the actuating link at the adjustment elements on making adjustments, an intense torsion of the actuating link results in the instance of the transmissions lacking. Such a torsion would not be tolerable in practice, as it would lead to imprecise adjustments. In order to reduce the resistances or the powers acting in the area of the adjustment elements and in order to at least largely avoid torsion of the actuating link, embodiment forms where the adjustment elements have a common actuating link and with the transmissions of the transport section according to the invention allow achieving a by far higher precision in adjusting the respective guide element. Altogether, this enables a multitude of adjustment elements with only one rotary drive. Technical calculations show that up to 40 adjustment elements can be realized with one rotary drive without any torsion worth mentioning of the actuating link. Preferably, between 10 and 30 adjustment elements are coupled.

If the transport section is designed such that the articles are guided along a curved path by the guide elements, the adjustment elements are preferably positioned offset to one another along the radius of the curve, making it impossible to couple the adjustment elements by a linearly extending drive shaft. In particular for the curved path, therefore, such embodiments have proven successful wherein the actuating link is formed from several cardan shafts and wherein each of the adjustment elements is associated with an own cardan shaft and respectively adjacent cardan shafts are torque-proofly coupled with each other. This means that the shafts serving for the rotary drive of respectively one adjustment element are connected with the shafts of the respectively adjacent adjustment elements, thus enabling a continuous rotary connection, even along curved paths, by means of several adjoining shafts, which are connected by cardanic joints. If, as previously mentioned, the adjustment elements each comprise at least one gear rack that can perform a forward and return stroke movement for adjusting the respective guide element, then the forward and return stroke movement of each of the at least one gear racks can be performed in perpendicular to the cardan shaft associated with the respective adjustment element.

It should be noted in this context that the terms "cardan shaft" and "cardanic joint" can each include different designs that meet the desired purpose, namely a largely torsion-free transmission of rotation along curved paths. For this purpose, the cardan joints can also be formed by suitable flexible elements that enable the desired torsion-less or largely torsion-free transmission of rotation along a non-linear path between two or more adjacent shaft sections, which are in a rotary connection with each other.

The transmissions of the transport section according to the invention also greatly reduce or even largely eliminate torsion of the cardan shafts in an embodiment form in which the actuating link is formed by several cardan shafts, thus enabling increased precision in adjusting the respective guide element.

A transport section that guides articles along a curved transport path involves further potential problems in practice. Known transport sections in this context include such that are formed from individual guide elements extending along the respective curved transport path. Repositioning of the guide elements, i.e. an adjustment of the distances between them, is associated with an enlargement of the curve radius, so that the adjusting or repositioning results in a gap between the individual guide elements, which gap can be closed using connection slats or wear strips. Repositioning thus entails a significant input. Furthermore, additional means, such as the mentioned connection slats or wear strips are also required in order to close a gap between the individual guide elements resulting from an adjustment.

To remedy this problem in practice, preferred embodiment forms can additionally provide that the respective guide element is designed to be flexible so that on changing the distance to the other guide element the radius of the curved path is adjustable by the respective several adjustment elements through an elastic deformation of the flexible guide element.

Embodiment forms involving a flexible design for the respective guide element have proven particularly successful when the respective guide element is formed from a synthetic material or optionally from a sufficiently flexible sheet metal. Preferably, the respective adjustable guide element can extend along the entire curved transport path.

It may furthermore be provided that the linear adjustment movement of the respective adjustment element is transmitted to a support shoe that is respectively associated and coupled with the guide element, which support shoe each comprises a contact surface that is brought to abut on the guide element and that at least approximately follows the path of the guide element. If several adjustment elements are provided for an adjustable guide element, each of the adjustment elements can be associated with a separate support shoe comprising a contact surface that is brought to abut on the guide element and that at least approximately follows the path of the guide element. All support shoes of the respective adjustment elements can extend together at least approximately along the respectively adjustable guide element. The support shoes can preferably be formed from a synthetic material. Of course other materials can be used as well, such as metal or wood or mineral materials. The support shoes can provide a shiftable support for the respective guide element and they also serve as a pressure support in a radially outward direction for the respective guide element.

If the respective adjustable guide element describes a curved path, the respective support shoes or the contact surfaces of the respective support shoes can follow the curved path of the guide element and planarly abut on the respective guide element. It is also conceivable that the associated support shoes together form a continuous and uninterrupted contact surface at the respective guide element at least for one of the joint adjustment positions of the adjustment elements.

For a simple and uncomplicated connection of the respective adjustable guide element with the respective support shoes, at least one adjustable guide element can be provided with a groove, into which the support shoes are inserted for shiftably supporting the guide element. Connecting the support shoes by a groove provided in the guide element can be particularly advantageous in embodiment forms in which the guide element is designed to be flexible and the respective radius of the guide element is adjustable by elastic deformation. It is expedient for the respective support shoe to be shiftably held in the groove of the respective guide element, preferably with a defined play, rather than being clamped into the groove of the guide element. On adjusting the guide element, the respective support shoes can then glide in the groove of the respective adjustment elements and be adjusted or approximated to the radius of the guide element, if necessary.

Embodiment forms where the support shoes are inserted with a slight play into the groove of the respective guide element have proven particularly successful for adjusting the curve radius of the guide element. The actual curve radius can be further approximated to a desired target curve radius by journaling the support shoes with a slight play in the respective groove. This play can optionally allow for slight movements between the shoe and the guide element in a vertical and/or in a horizontal direction.

If the respective guide element is excessively worn and has to be replaced, embodiment forms where the guide element forms a groove have the further advantage of simple replacement of the guide element without prior loosening of fixation means such as screws or the like.

As an alternative to the described embodiment form, the support shoes can each form a groove and the respective guide element can comprise one or more noses to be inserted into the respective groove of the support shoe. Such embodiment forms can also involve a slight play between the noses and the respective grooves.

Both of the two approximately parallelly arranged guide elements can furthermore each be adjustable in transverse to the conveying direction in their respective distance to the other of the guide elements by several adjustment elements. In this instance, a first of the two approximately parallelly arranged guide elements can be associated with several first adjustment elements. Furthermore, a second of the two approximately parallelly arranged guide elements can then be associated with several second adjustment elements. The first and the second adjustment elements can each comprise at least one gear rack. The gear racks of the first adjustment elements can be in pairwise alignment with gear racks of the second adjustment elements, the adjustment elements thus respectively facing each other pairwise on both outer sides of the transport path. As previously described, both guide elements can be designed to be flexible.

It is also conceivable in this context that all first adjustment elements are associated with a first rotary drive and all second adjustment elements are associated with a second rotary drive. All first adjustment elements can be coupled by a first rotating actuating link with the first rotary drive while all second adjustment elements are coupled by a second rotating actuating link with the second rotary drive. As described above, the first and/or the second actuating link can each be formed by several cardan shafts. Continuous shafts, for instance continuous square bars, can also be used for the aligned connection of all adjustment elements if the transport path is straight. Shaft sections that abut on each other can possibly also be coupled with rigid connection elements, thus enabling a largely play-free and torsion-free transmission of rotation between the consecutively placed adjustment elements of one side of the horizontal conveyor device.

Embodiment forms with an identical number each of first and of second adjustment elements have proven to be particularly successful in practice. First adjustment elements can be arranged pairwise with second adjustment elements on opposite sides of a transport path of the articles. The respective linear adjustment movement of the first adjustment elements can each be directed toward the opposite second adjustment element. The respective linear adjustment movement of the second adjustment elements can each be directed toward the opposite first adjustment element.

It is also conceivable that all first adjustment elements and all second adjustment elements are coupled with a common rotary drive and that, as an effect of the common rotary drive, the linear adjustment movement of all first adjustment elements is performed at least approximately synchronized with the linear adjustment movement of all second adjustment elements.

The invention also relates to a transport section of a horizontal conveyor device for conveying articles, such as bottles or cans, which are moved along, preferably pneumatically, in a standing position on a transport support surface.

It should be noted that all features applying to the previously described transport section are also conceivable for various embodiment forms of the further transport section according to the invention.

It is possible, for instance, that the articles take the form of cans, which are moved along by compressed air in a standing position on the respective transport support surface.

If the cans are not filled, the transport via pneumatic conveying involves the problem that the cans are possibly lifted off of the transport support surface due to their lack of weight.

In order to counteract this problem, a guide element is arranged to be oriented at least approximately in parallel to the transport support surface above the articles and along their trajectory in the transport section according to the invention. The room for the articles to move freely is limited in the vertical direction by the guide element.

Here, the distance between the guide element and the transport support surface is preferably selected to correspond at least to the maximum article height and preferentially to be slightly greater than the maximum article height. The distance between the guide elements and the transport support surface is preferably selected to exceed the article height by 2 to 5 millimeters. The articles or cans are thus moved along between the transport support surface and the respective guide element. It is conceivable for articles or cans to be moved along between the transport support surface and the respective guide element in an orderly or in a disorderly mass flow.

The lateral movement of the articles or cans can reasonably be limited by stationary wall sections, which extend along a transport path of the articles. The articles or cans can also be conveyed individually or in assembled bundles with a second transport support surface according to the invention. It is also conceivable that the distance of the lateral walls is variable and that this is combined with an additional adjustment for height adjustment.

The relative distance of the guide element to the transport support surface is furthermore provided to be predefinable by several adjustment elements attached to a machine frame or base frame, which adjustment elements are linked to a rotary drive. Several first adjustment elements can, for instance, be arranged on a first side of an article transport lane and several second adjustment elements can be arranged on a second side of the transport lane. The second side can be arranged to be opposite the first side. All first adjustment elements of a transport section can be linked to a first rotary drive, while all second adjustment elements of a transport section are linked to a second rotary drive. In other embodiment forms it is conceivable that all adjustment elements of a transport section are linked to a common rotary drive.

The adjustment movement of all first adjustment elements can be synchronized and/or the adjustment movement of all second adjustment elements can be synchronized. All first adjustment elements and/or all second adjustment elements can be linked, for instance, by a common shaft to the respective rotary drive or drives.

According to the invention, each adjustment element transmits a rotatory drive of the common rotary drive via one or more transmissions to a linear adjustment movement of the guide element linked to it. The linear adjustment movement is preferably oriented in perpendicular to the respective transport support surface. If there are first and second adjustment elements—as described above— the first and second adjustment elements can comprise gear racks wherein the gear racks of the first adjustment elements and the gear racks of the second adjustment elements are guided in parallel to each other.

A positioning of the guide elements with automatic position detection would be suitable for all of the adjustments described. The position detection can be performed by means of three procedures. The first variants involve counting the impulses which are emitted proportionally on moving the adjustment elements. An incremental encoder can be installed for this purpose on the actuating link or at the motor or directly at the manual crank. A further variant involves using an absolute encoder installed in the same position. Suitable conversion of increments or absolute values to a length specification yields direct positioning data; a one-time input of a reference point is, however, necessary. Is particularly advantageous to detect the position of the guide element by means of a sensor system with integrated distance measurement. Laser sensors or ultrasonic sensors, which make the values immediately available as an output signal using analog signals or a binary protocol, are especially suited to the task.

Controlled positioning is made possible by two limit switches for protecting the mechanical components together with a programmable logic controller. A friction clutch can also be used for protecting the mechanical components.

Additionally employing a speed control for the motor will allow initially rapid approximation to the desired position and a slower approximation on falling below a threshold value.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIG. 6 shows a schematic perspective view of an alternative embodiment variant of a transport section according to the invention.

FIG. 7 shows a schematic perspective view of an adjustment element as it may be employed for various embodiment forms of the transport section according to the invention.

DETAILED DESCRIPTION

Figure 1:
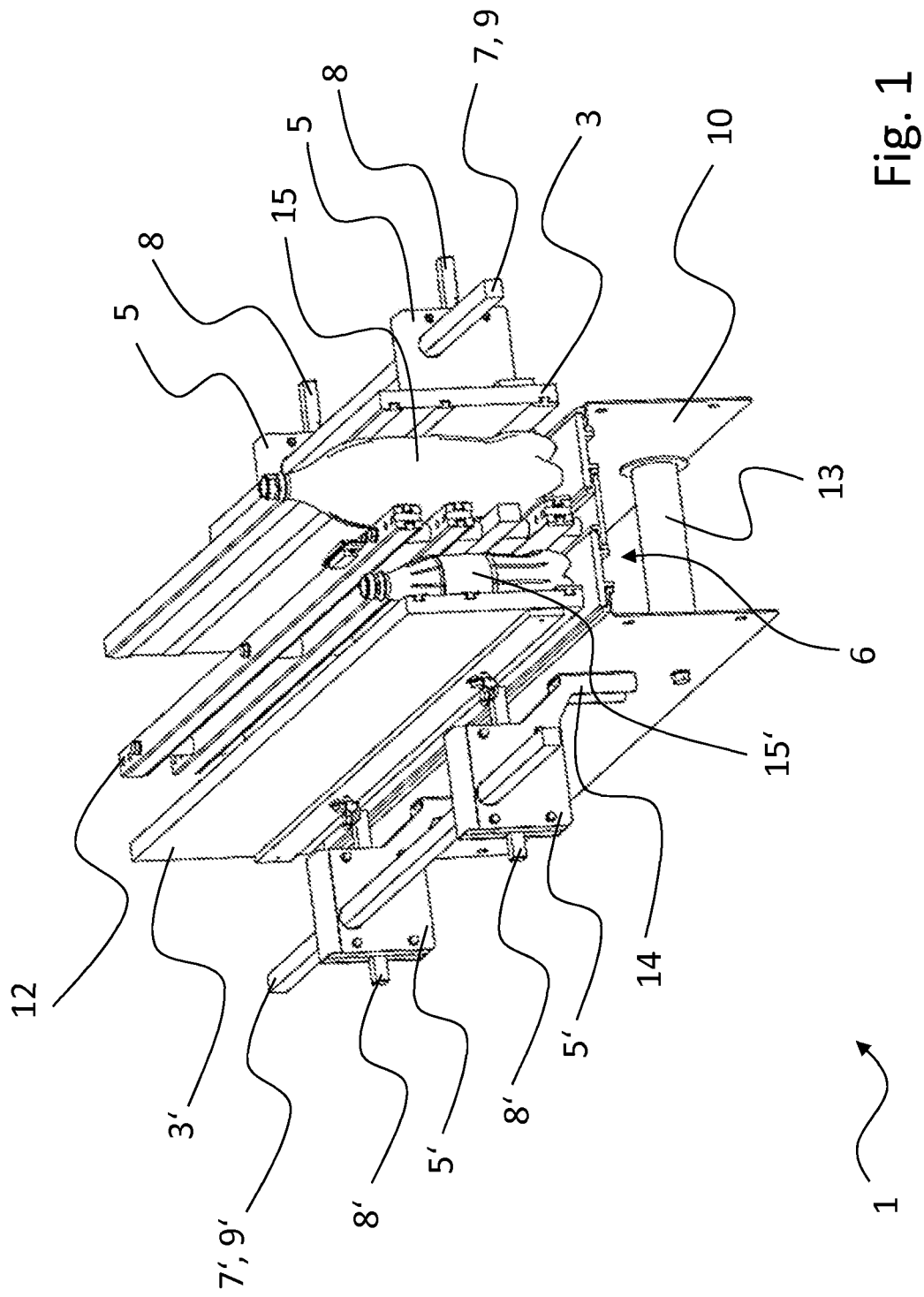
FIG. 1 shows a schematic perspective view of an embodiment form of a transport section according to the invention.

The same or equivalent elements of the invention are each designated by the same reference characters in the FIGS. 1 to 7. Furthermore and for the sake of clarity, only the reference characters relevant for describing the respective figure are provided. It should be understood that the detailed description and specific examples of the transport section according to the invention, while indicating preferred embodiments, are intended for purposes of illustration only and are not intended to limit the scope of the invention. In particular, any changes between straight and curved paths of the transport section are possible using only one rotary drive, which is advantageously arranged centrally. The term "central" is to be understood as meaning that the actuating links or shafts of the rotary drive extend in both directions along the transport section to the individual adjustment elements.

It should be pointed out once again that adjustments to the guide elements apply to single-lane, double-lane, or multi-lane transport as well as to mass flows. It is also possible to make adjustments to the guide element on only one side of the transport section with the corresponding opposite railing being designed to be stationary.

The schematic perspective view in FIG. 1 shows a first embodiment variant of a transport section 1 according to the invention. The transport section 1 is designed for conveying articles, such as beverage containers or bottles 15, with the exemplary embodiment in FIG. 1 displaying a first bottle 15 with a first profile or a first size and a second bottle 15' with a second profile or a second size. Before the bottles 15 and 15' enter into the transport section 1, the bottles 15 and 15' are separated according to maximum profile or maximum size of the bottles 15 or 15' (separation procedure not shown here).

As is discernible from FIG. 1, the profile of the second bottle 15' is formed smaller than the profile of the first bottle 15. In practice, several bottles 15 and 15' as shown in the exemplary embodiment in FIG. 1, each with identical profiles and arranged consecutively in a row, will normally be conveyed over the transport section 1. For the purpose of clarity, each row of bottles is represented by only one bottle 15 or 15' here. In the exemplary embodiment in FIG. 1, the respective rows of consecutively conveyed bottles 15 and 15' move along in parallel to each other.

Further discernible is a transport support surface 6 extending in the horizontal conveying direction of the bottles 15 and 15', on which transport support surface 6 the bottles 15 and 15' stand. The transport support surface 6 is stationary or moves and the bottles 15 and 15' glide along or are moved along the transport support surface 6. In other embodiment forms, the transport support surface 6 can also take the form of circulating conveyor belts, link belts, link chains, or other conveyor devices.

Also displayed is an exemplary machine frame 10, with which the transport support surface 6 is connected or screwed together. In the exemplary embodiment shown here, the machine frame 10 is indicated by two parallelly oriented lateral walls, which are stabilized and connected by several intermediately arranged distance pieces, which are screwed to the lateral walls. Such an exemplary distance piece is displayed with the reference character 13 in FIG. 1.

The articles or the bottles 15 and 15' are moved along between two parallelly arranged and adjustable guide elements 3 and 3'. Arranged between the two guide elements 3 and 3' in the exemplary embodiment in FIG. 1 is a partition wall 12, which extends in parallel to the two guide elements 3 and 3'. In the present instance, the partition wall 12 is formed by several guide rods arranged on top of each other and oriented in parallel to each other. The partition wall 12 is fixed in place and cannot be moved in relation to the guide elements 3 and 3'.

The bottles 15' with the smaller profile or smaller size are transported between the second 3' of the two guide elements 3 and 3' and the partition wall 12 (on the left in the drawing of FIG. 1), while the bottles 15 with the larger profile or larger size are transported between the first 3 of the two guide elements 3 and 3' and the partition wall 12 (on the right in the drawing of FIG. 1). The distance between the two guide elements 3 and 3' and the partition wall 12 should be selected such that the bottles 15 and 15' can be transported between the respective guide element 3 or 3' and the partition wall 12 stably and without toppling over or jamming.

Accordingly, the distance between the first guide element 3 and the partition wall 12 is slightly greater than the maximum profile or diameter of the first bottle 15, while the distance between the second guide element 3' and the partition wall 12 is slightly greater than the maximum profile or the maximum diameter of the second bottle 15'. The distance between the guide elements and the partition wall 12 is preferably selected to exceed the respective article or container width by 2 to 5 millimeters.

It is advantageous to provide an adjustment range that allows varying the distance of the guide elements per adjustment element by 40 to 120 millimeters, with 60 millimeters being particularly advantageous.

As the bottle 15 has a greater maximum profile or diameter than the second bottle 15', the distance between the first guide element 3 and the partition wall 12 is formed to be greater than the distance between the second guide element 3' and the partition wall 12.

After an extended duration of transporting bottles 15 or 15' over the transport section 1, the guide elements 3 and/or 3' can show signs of wear on their sides facing the bottles 15 and 15', resulting in a greater distance than the original distance between the respective guide element 3 or 3' and the partition wall. In this instance, the guide elements 3 or 3' require readjusting and for this purpose are each moved in the direction toward the partition wall 12 in order to compensate for the signs of wear and in order to decrease the respective distance between the guide element 3 or 3' and the partition wall 12. Such an adjustment or readjustment has to be performed very sensitively, thus requiring mechanisms which allow readjustment in such a manner that the guide elements 3 or 3' can be approximated to the partition wall 12 by only a very small distance.

It may furthermore be provided that other bottles 15 and 15' are to be conveyed over the transport section 1, which other bottles 15 and 15' differ in maximum profile or diameter from the bottles 15 or 15'. Such an instance also necessitates adjusting the guide elements 3 and 3' in order to adjust the distance between the partition wall 12 and the respective guide elements 3 and 3' to the maximum profile or diameter of the bottles to be subsequently conveyed.

For this purpose, the invention comprises several adjustment elements 5 and 5', which are arranged on both sides of a transport lane of the bottles 15 and 15'. Here, first adjustment elements 5 are brought into contact with the first guide element 3, while second adjustment elements 5' are brought into contact with the second guide element 3'. Each of the adjustment elements 5 or 5' possesses a gear rack 8 or 8', which can perform a forward and return stroke in perpendicular to the transport direction of the bottles 15 or 15' and on a level in parallel to the transport belt surface.

The embodiment form shown in FIG. 1 for adjusting the guide elements 3 or 3' by exactly four adjustment elements 5 or 5' is to be understood purely as an example; other embodiment forms of transport sections 1 may exist in practice with adjustment elements 5 or 5' that differ in number and design from the embodiment form shown in FIG. 1. All of the adjustment elements 5 or 5' are respectively attached to the machine frame 10 by an associated support arm 14 (cf. FIGS. 4 and 5).

A detailed view of an embodiment form for an adjustment element 5 or 5' as it may also be employed for the transport section of FIG. 1 is given in FIG. 7. The exemplary embodiment shown in FIG. 7 may also be employed for the transport section 1 according to the FIGS. 2 to 6.

The gear racks 8 or 8' of the adjustment elements 5 or 5' are each supportingly linked with their associated guide element 3 or 3' by screw connections or by other suitable attachment means. All gear racks 8 or 8' are further oriented in parallel to each other. Gear racks 8 or 8' of adjustment elements 5 or 5' arranged on opposite sides are in pairwise alignment here, this however not being constitutive for faultless functioning of the device according to the invention.

The first adjustment elements 5 of the first guide element 3 shown in FIG. 1 are actuated at least approximately synchronized by a common and rotating actuating link 7, which is designed as shaft 9. The second adjustment elements 5' of the second guide element 3' are also actuated by a common and rotating actuating link 7', which is designed as shaft 9', in approximate synchrony with each other.

Each of the actuating links 7 and 7' or each shaft 9 and 9' is rotatingly driven about its longitudinal axis by an own rotary drive (not shown here) when the respectively associated guide element 3 or 3' is adjusted. The rotary drive can take the form of an electric motor, for instance. It is also conceivable for the rotary drive to be formed as a manual crank or the like. Other possibilities for the rotary drive are conceivable, too.

In order to ensure the parallel orientation of the two guide elements 3 or 3' after adjustment, the forward and return stroke of the two gear racks 8 or 8' has to be identical.

On actuating the adjustment elements 5 or 5', the respective shaft 9 or 9' transmits a momentum to the adjustment element 5 or 5', which can result in torsion of the shaft 9 or 9'. It is accordingly possible that the forward or return stroke of a number of the first gear racks 8 and/or the second gear racks 8' effected by the respective adjustment turns out to be different due to the torsion, resulting in the respective guide elements 3 and/or 3' no longer being oriented in parallel to each other after the adjustment.

As shown in the exemplary embodiment in FIG. 7, the transport section 1 therefore possesses adjustment elements 5 and 5', which each comprise one or more transmissions 18, which transmit the rotating movement of the shafts 9 and 9' to a linear adjustment movement of the gear racks 8 and 8' and of the guide element 3 or 3' linked thereto. The one or more transmissions 18 increase the rotational frequency of the shaft 9 or 9', which is necessary for readjusting the respective guide element 3 or 3'. At the same time, the positioning force required for actuating the adjustment elements 5 and 5' is reduced many times over.

The transmissions 18 on the one hand offer the advantage of making it possible to predefine very precisely the position of the respective guide element 3 or 3' at a reduced positioning force. Such precise positioning is particularly necessary when compensating for signs of wear, as previously mentioned. The one or more transmissions 18 of the transport section 1 according to the invention further offer the advantage of making it possible to increase many times over the holding forces of the gear racks 8 and 8' and of the guide elements 3 and 3' coupled to the gear racks 8 and 8'.

This ensures a stable bearing of the guide elements 3 and 3' by the gear racks 8 and 8'. It has been shown in practice that the forces to be exerted by the shafts 9 and 9' for actuating the adjustment elements 5 and 5' can be reduced, for instance, by a fourth, thus resulting in reduced torsion of the shaft 9 or 9' and in turn in the possibility of retaining the parallel alignment precisely and nearly completely when adjusting the guide elements 3 and 3'.

It has further been shown that the holding forces of the gear racks 8 or 8' can be, for instance, multiplied by four in relation to embodiment forms without gearing. The transmissions 18 therefore provide a more stable overall construction.

Figure 2:
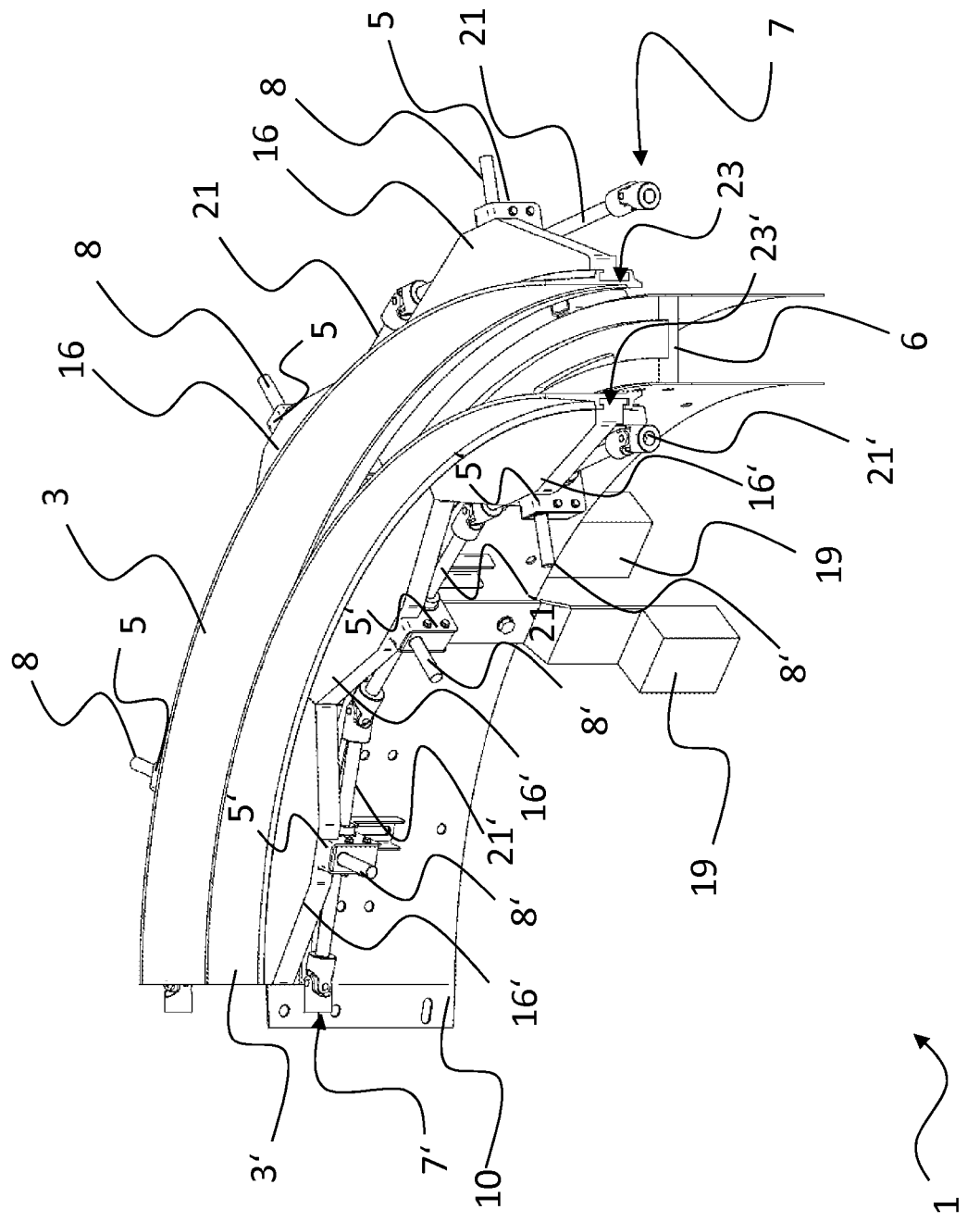
FIG. 2 shows a schematic perspective view of a curved part of the transport section.

FIG. 2 shows a schematic perspective view of another embodiment form of the transport section 1 according to the invention, in this instance a curved transport section 1. The transport section 1 from the exemplary embodiment in FIG. 2 is designed for conveying bottles 15 or 15' (cf. FIG. 1), which, for reasons of clarity, are not shown in the exemplary embodiment in FIG. 2. The transport section 1 in the exemplary embodiment in FIG. 2 shows a single-lane transport.

Here, the bottles 15 or 15' are conveyed in one row and standing on the transport support surface 6. A partition wall 12 as shown in the exemplary embodiment in FIG. 1 is not present in the single-lane conveyance of bottles 15 or 15' in FIG. 2. If a flow of bottles 15 or 15' is to be conveyed in two lanes, a partition wall 12 can be provided to be arranged between the two guide elements 3 and 3' and to follow the curved path of the transport support surface 6.

In analogy to the exemplary embodiment in FIG. 1, the transport support surface 6 in FIG. 2 is designed to be stationary with the articles or bottles 15 or 15' gliding over the transport support surface 6 on being transported. The transport support surface 6 is furthermore fixedly connected with the machine frame 10, which stands on a floor surface supported by supporting legs 19. The machine frame 10 also extends in a curved path together with the transport support surface 6.

The one-lane flow of bottles 15 or 15' is moved along between the first guide element 3 and the second guide element 3'. The first guide element 3 and the second guide element 3' direct the respective bottles 15 or 15' along a curved track or a curved transport lane and they are arranged approximately in parallel to each other for this purpose. In order to be able to guide the single-lane flow of bottles 15 or 15' stably and without jamming along the curved transport lane, the distance between the two guide elements 3 and 3' is slightly greater than the maximum profile diameter of the respective bottles 15 or 15'.

The two guide elements 3 and 3' in the exemplary embodiment in FIG. 2 are designed to be adjustable in transverse to the conveying direction each by three adjustment elements 5 or 5'. Each of the adjustment elements 5 or 5' comprise several transmissions 18. FIG. 7 displays a detailed possible design for the adjustment elements 5 and 5' in the exemplary embodiment in FIG. 2.

Just like in the exemplary embodiment shown in FIG. 1, the adjustment elements 5 or 5' here also each comprise a gear rack 8 or 8'. In FIG. 2, the gear racks 8 and 8' are each coupled to a support shoe 16 or 16', which each comprise a contact surface that at least approximately follows the curved path of the respective guide element 3 or 3'. The forward and return stroke movement of the gear racks 8 or 8' is each oriented in parallel to the transport support surface 6.

The first adjustment elements 5 for the first guide element 3 and the second adjustment elements 5' for the second guide element 3' are respectively coupled to each other and synchronized via a common rotary drive (not shown here). The rotary drive in the exemplary embodiment of FIG. 2 can also take the form of an electric motor or a manual crank. Coupling to the respective rotary drive is effected by the actuating links 7 and 7' in FIG. 2. Here, the first adjustment elements 5 are controlled by the actuating link 7 and the second adjustment elements 5' by the actuating link 7'.

Both the actuating link 7 and the actuating link 7' are formed by several cardan shafts 21 or 21' wherein each of the adjustment elements 5 or 5' is associated with an own cardan shaft 21 or 21'. Adjacent cardan shafts 21 or 21' are torque-proofly connected with each other and opposite cardan shafts 21 or 21' are always arranged pairwise to be oriented essentially in parallel to each other.

According to the schematic presentation, the cardan shafts 21 or 21' possess a round profile in FIG. 2. In preferred embodiment forms, the cardan shafts 21 and 21' can possess a rectangular profile and be directly coupled to the drive at the respective one or more transmissions 18 of the adjustment elements 5 or 5'. Particularly suitable embodiment forms are those in which cardan shafts 21 or 21' or actuating links 7 and/or 7', having a non-circular and polygon or elliptical profile, engage form-lockingly for the drive with the one or more transmissions 18.

As the cardan shafts 21 or 21' in the exemplary embodiment of FIG. 2 also transmit a momentum to the respectively associated adjustment element 5 or 5', there is a risk of an intense torsion of the cardan shafts 21 or 21' resulting. For this reason, the adjustment movement of the adjustment elements 5 or 5' along the curved path of the guide element 3 or 3' possibly does not take a regular form, thus resulting in the first guide element 3 to be no longer guided essentially in parallel to the second guide element 3' after the adjustment.

To avoid the described problem, the transport section from FIG. 2 also possesses adjustment elements 5 and 5', which are designed according to the exemplary embodiment from FIG. 7 and each comprise one or several transmissions 18. The one or more transmissions 18 increase the rotational frequency of the cardan shafts 21 or 21', and at the same time, the positioning force required for actuating the adjustment elements 5 and 5' and for readjusting the guide elements 1 and 3' is reduced. Furthermore, the torsion of the cardan shafts 21 or 21' is decreased, thus enabling a more precise positioning of the guide elements 3 or 3'.

Both of the two guide elements 3 and 3' shown in FIG. 2 are made from a synthetic material and are flexible or reversibly deformable. If a readjustment of the guide elements 3 or 3' is performed by the respective adjustment elements 5 or 5', the radius of the curved path is at least approximately adjustable due to the flexibility of the two guide elements 3 and 3'.

The support shoes 16 or 16' possess contact surfaces for this purpose, which contact surfaces at least approximately follow the path of the guide elements 3 or 3'. It is also discernible in FIG. 2 that the support shoes 16' settle in their positions such that they are brought into contact with each other and together form a continuous contact surface toward the guide element 3'. A movement of the support shoes 16' in the direction of the first guide element 3' and by means of a forward stroke movement of the gear racks 8' is possible in order to reduce the distance between the first and the second guide element 3 and 3', while another movement of the support shoes 16' away from the first guide element 3 and by means of a return stroke movement of the gear racks 8' is prevented by the respective adjacent contact of the support shoes 16'. The support shoes are thus transferred into a stop position.

The guide elements 3 or 3', in addition, each comprise a groove 23 and 23', in which the support shoes 16 or 16' are shiftably mounted. It is also conceivable for the support shoes 16 or 16' to comprise a groove, in which the guide elements 3 or 3' are shiftably mounted, wherein the guide elements 3 or 3' are fixedly attached only once at the central support shoe 16 or 16'.

The bearing of the support shoes in the respective groove 23 or 23' is formed with a certain play so that the respective curve radius can be approximated to a desired target radius by means of the play in the groove 23 or 23' and on adjusting the guide elements 3 or 3'. Additional connection strips as known from prior art embodiment forms are not necessary so that the repositioning of the guide elements 3 and 3' can be performed in a simple and time-saving manner according to the exemplary embodiment in FIG. 2. Connecting the support shoes 16 or 16' with the respective guide elements 3 or 3' by means of a groove 23 or 23' in the guide element 3 or 3' furthermore enables a simple replacement of the guide elements 3 or 3', for example in the instance of signs of wear.

Figure 3:
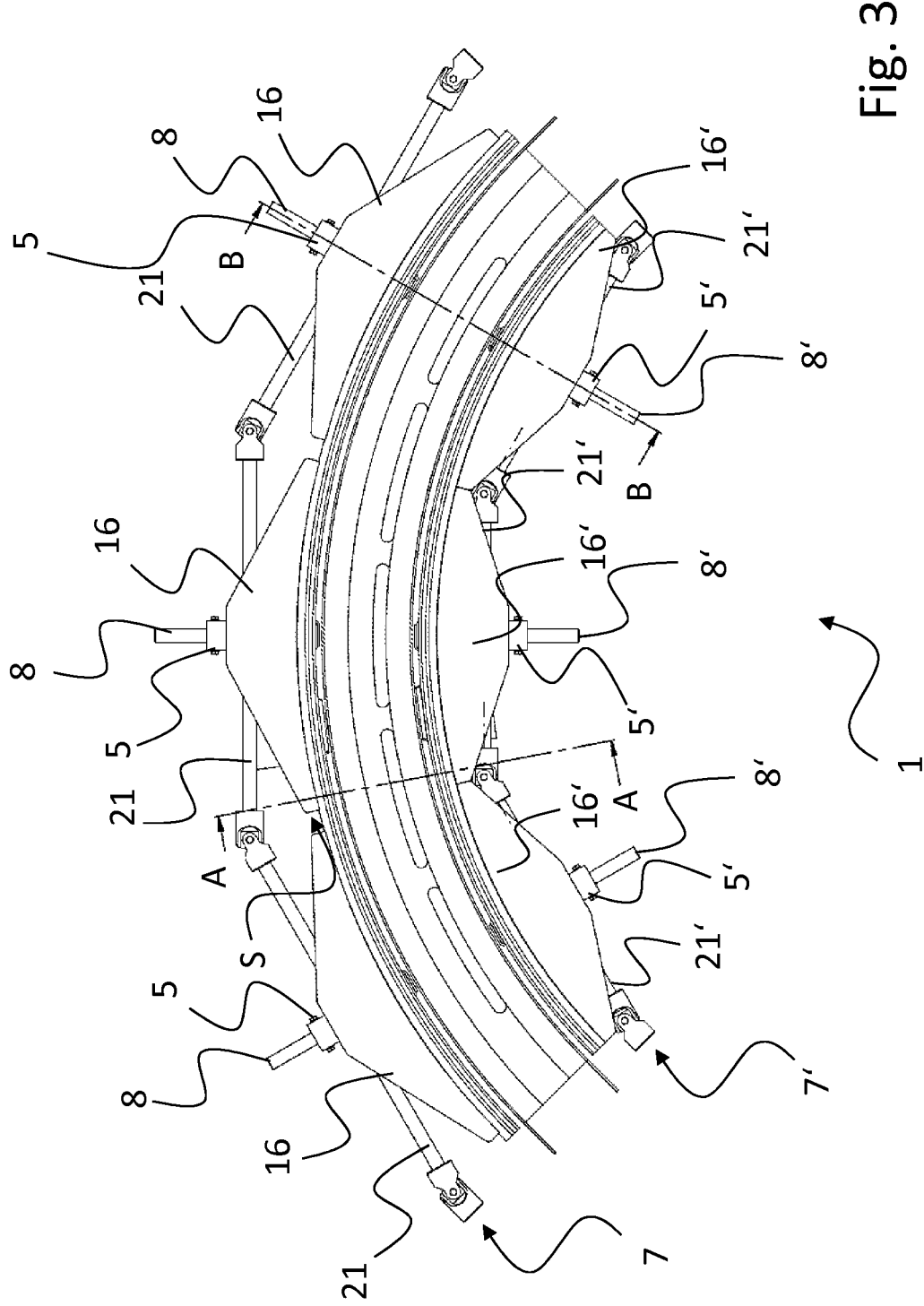
FIG. 3 shows a schematic top view of an embodiment form from FIG. 2.

The position of the support shoes 16 or 16' and the resulting technical effect on connecting them with the respective elastically formed guide element 3 or 3' is once again illustrated in the top view of FIG. 3.

Thus a gap S forms in each case between two adjacent support shoes 16 which have settled in their position as in FIG. 3. In the embodiment forms known from prior art, the respective guide elements are formed by segments so that a resulting gap S has to be closed by connection slats.

In the exemplary embodiment in the FIGS. 2 and 3, the guide elements 3 or 3' extend along the entire transport section and are designed to be elastic. By a movement of the support shoes 16 or 16' in the longitudinal direction of their respectively associated gear rack 8 or 8', it is possible to elastically deform the respective guide element 3 or 3' when it abuts on one of the contact surfaces of the respective support shoe 16 or 16', wherein the path of the respective guide element 3 or 3' is at least approximated to a target curve radius.

In FIG. 3 it is moreover discernible that each first support shoe 16 is associated with a respective second support shoe 16' on the opposite side of the transport lane. The support shoes 16 and 16' are thus arranged pairwise along the transport lane of the articles. The number of support shoes 16 and of the respective adjustment elements 5, which are brought into an operative connection with the first guide element 3, is thus identical to the number of support shoes 16' and of the respective adjustment elements 5', which are brought into a connection with the second guide element 3'.

Figure 4:
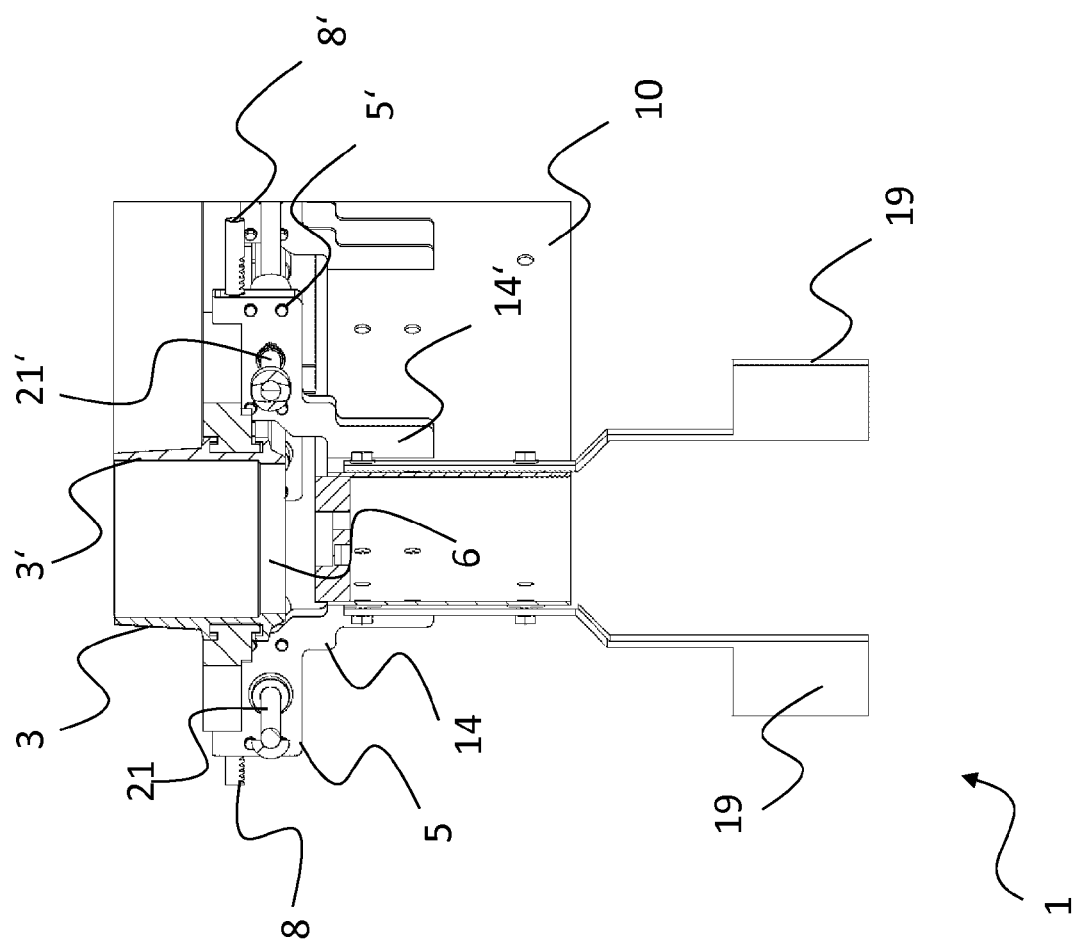
FIG. 4 shows a schematic cross section through the embodiment form from the FIGS. 2 and 3 along the line A-A from the FIG. 3.

The illustration in FIG. 4 shows a schematic cross section through the embodiment form from the FIGS. 2 and 3 along the line A from the FIG. 3. In the cross section of FIG. 4, the supporting legs 19 for the transport section 1 are again discernible, which supporting legs 19 are fixed to the outer side of the machine frame 10 by means of screw connections. Further discernible are the gear racks 8 of the adjustment elements 5, the forward and return stroke of which is oriented in perpendicular to the transport support surface 6. The cross section of the cardan shafts 21 or 21' takes a circular form in the present instance. As previously mentioned, it is conceivable in various preferred embodiment forms that the cardan shafts 21 or 21' possess an elliptical or polygon profile.

FIG. 4 furthermore shows an embodiment form of a support arm 14 or 14', which is formed to connect the respective adjustment element 5 or 5' with the machine frame 10. In contrast to the exemplary embodiment in FIG. 1, the support arms 14 or 14' possess a curved profile in the cross section of FIG. 5. It is additionally possible that the support arms 14 or 14' comprise a longitudinal slot L (cf. FIG. 7), through which one or more fixation means—for instance screw connections—are inserted. Advantageously, the respective adjustment element 5 or 5' associated with the support arm 14 or 14' can thus be fixated at different vertical levels on the machine frame 10.

Figure 5:
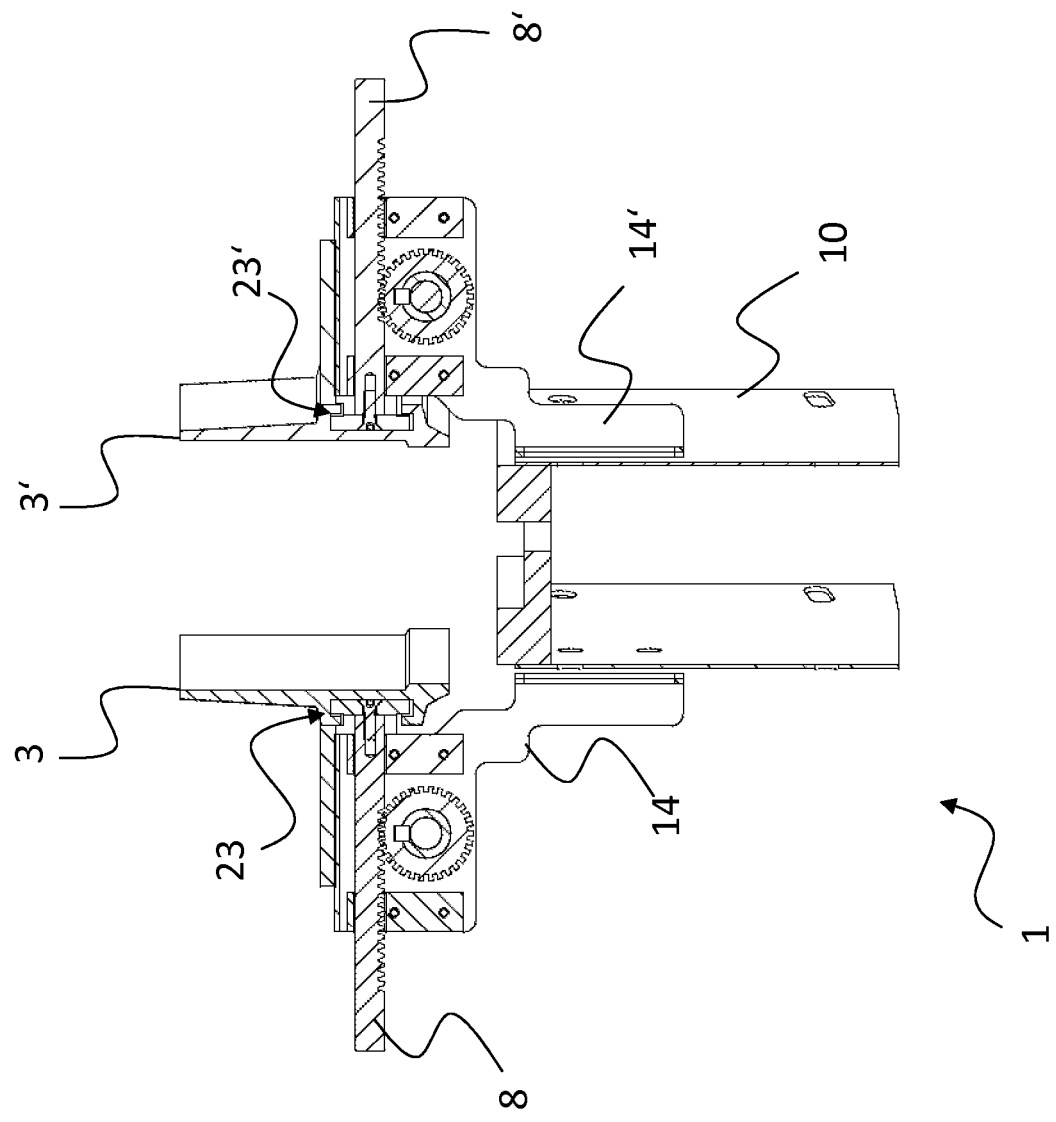
FIG. 5 shows a further schematic cross section through the embodiment form from the FIGS. 2 to 4 along the line B-B from the FIG. 3.

The illustration in FIG. 5 shows another schematic cross section through the embodiment form from the FIGS. 2 to 4 along the line B from the FIG. 3. Discernible in the cross section from FIG. 5 are once more the groove 23 of the first guide element 3 and the groove 23' of the second element 3'.

Further discernible are the gear racks 8 and 8', which are inserted through the respective adjustment element 5 or 5'. The adjustment elements 5 or 5' are illustrated only schematically in FIG. 5 and designed according to the exemplary embodiment in FIG. 7.

The schematic perspective view in FIG. 6 shows a further embodiment form of another transport section 1' according to the invention. The schematically indicated transport section 1' in FIG. 6 is designed for conveying cans 17, which in this instance are moved along in an unfilled state and in a standing position on a transport support surface 6' by means of compressed air. Shown in the exemplary embodiment in FIG. 6 is conveyance of the cans 17 being moved along in several lanes and in an orderly state. Embodiment forms are also conceivable, however, in which the cans 17 are moved along in a disorderly mass flow.

As the cans 17 are not filled, conveyance by compressed air involves the problem that the cans 17 will possibly not stand stably on the transport support surface 6' due to their lack of weight.

For this purpose, a guide element 3" is provided, which is arranged to be oriented at least approximately in parallel to the transport support surface 6' above the cans 17 and along their trajectory. If the cans 17 are guided by means of compressed air, the guide element 3" can limit their vertical freedom of movement when they are lifted off of the transport support surface 6'.

In the present instance, the distance between the guide element 3" and the transport support surface 6' is slightly greater than the maximum vertical extension of the cans 17'; preferably, the distance is 1 to 5 millimeters greater than the maximum vertical extension of the cans, and particularly advantageously about 1 to 3 millimeters greater.

In order to limit the lateral freedom of movement of the cans 17 during transport, the transport section 1' comprises several wall sections 25 and 25' extending in parallel to the transport direction of the cans 17 and attached to a machine frame 10'. The wall sections 25 and 25' are furthermore oriented in perpendicular to the transport support surface 6' and in perpendicular to the guide element 3".

The relative distance of the guide element 3" to the transport support surface 6' can be predefined by at least on first adjustment element 5 and at least one second adjustment element 5'. To ensure safe transport of the cans 17, the relative distance of the guide element 3" to the transport support surface 6' has to be adjustable as precisely as possible, because too great a distance may lead to disorientation or a resulting disorder of the cans 17 and too small a distance will cause the cans 17 to become jammed between the transport support surface 6' and the guide element 3".

The adjustment elements 5 and 5' therefore comprise several transmissions 18 for sensitive handling, said transmissions 18 illustrated in detail in the following FIG. 7.

It is for instance conceivable that several first adjustment elements 5 on the first side of the transport section 1' can be linked to the guide element 3". If required, the several first adjustment elements 5 can be linked to each other by a common actuating link 7 or a common drive shaft 9 as illustrated in the exemplary embodiment in FIG. 1. In addition, several second adjustment elements 5' can be linked to the guide element 3" on another, opposite side of the transport section 1. The second adjustment elements 5' can possibly be linked to each other by a further common actuating link 7' or a further common drive shaft 9' as illustrated in the exemplary embodiment in FIG. 1.

As is also discernible in FIG. 6, the gear racks 8 and 8' of the adjustment elements 5 and 5' are each oriented in perpendicular to the transport support surface 6' and in perpendicular to the guide element 3". The forward and return stroke of the gear racks 8 and 8' for lifting and lowering the guide element 3" is thus performed in a direction perpendicular to the transport support surface 6'.

As the guide element 3" is fixedly connected with the two gear racks 8 and 8', repositioning of the guide element 3" is effected by synchronous lifting and lowering by means of both the first and second adjustment elements 5 and 5'. Thus, the guide element 3" is always oriented in parallel to the transport support surface 6' while being lifted and lowered by means of the respective adjustment elements 5 and 5'.

The adjustment elements 5 and 5' are connected to the machine frame 10, 10' by way of attachment. The adjustment elements 5 and 5' can be screwed to the machine frame 10, for instance; another suitable connection is by means of a support arm 14 as exemplarily shown in the FIGS. 1, 4, and 5.

FIG. 7 finally shows a further schematic perspective view of an adjustment element 5 as it may be employed for various embodiment forms of a transport section 1 or 1' according to the invention, in particular for embodiment forms according to FIGS. 1 to 6. Via the transmissions 18, the adjustment element 5 transmits a rotary drive to a linear adjustment movement of the respective guide element 3 or 3' (cf. FIGS. 1 to 6). On activating the rotary drive, the transmissions 18 and the resultant linear adjustment movement of the respective adjustment element 5 enable performing very precise adjustment of the respective position of the adjustable guide element 3 or 3'.

A support arm 14 is provided for attaching the adjustment element 5 to a base frame or to an according machine frame 10 of the respective transport section 1 or 1'. The support arm 14 comprises a longitudinal slot L, through which fixation means, such as screw connections, can be inserted to fixate the adjustment element 5 at the desired vertical level on the machine frame 10 or the base frame. The support arm 14 encompasses the casing 27 of the adjustment element 5 and possesses drilled holes, which are aligned with other drilled holes of the casing 27, and through which screw connections 28 are inserted for fixating the support arm 14 on the casing 27 of the adjustment element 5.

Furthermore, the casing 27 is formed by a first part 29 and a second part 29', which first part 29 and which second part 29' are also fastened to each other by means of screw connections 28. The casing 27, which protects the transmissions 18 against contamination, can be made from a synthetic material or metal, for instance. In the instance of one or more components of the transmissions 18 being damaged or worn, the simple fixation of the two casing halves 29 and 29' by means of screw connections allows easy separation of the two casing halves 29 and 29' by undoing the screw connections 28 and subsequently replacing the respective components.

The transmissions 18 comprise an input means 30 having external teeth and a rotating transmission means 32 intermeshing comb-like with the input means 30. The input means 30 and the transmission means 32 rotate in opposite senses. As the transmission means is designed to have a greater number of teeth than the input means, the input means 30 possesses a higher rotational frequency than the transmission means 32. To improve the sensitivity in repositioning the respective guide elements 3 or 3', preferred embodiment forms provide that the number of teeth of the transmission means 32 is at least 1.5 times the number of teeth of the input means 30 and particularly advantageously approximately 2 times the number of teeth of the input means 30.

It is further discernible that the adjustment element 5 comprises a gear rack 8 for transmitting the linear adjustment movement to the respective adjustable guide element 3 or 3'. The gear rack 8 intermeshes comb-like with an output means, which is not discernible in FIG. 7 and concealed by the transmission means 32. The output means is designed as gear wheel and is seated torque-proofly, together with the transmission means 32, on the shaft 35, wherein, advantageously, the output means and the transmission means 32 are formed in one piece. Furthermore, the gear rack 8 is inserted through the casing 27 and is also supported by the casing 27.

The gear rack 8 possesses gear teeth Z only in a defined section. The forward and return stroke, which the gear rack 8 of the adjustment element 5 can perform, is limited by the gear teeth being arranged only in sections of the gear rack 8. In practice, limiting the arrangement of gear teeth Z to sections of the gear rack 8 further offers the possibility of predefining definite stop positions for the gear rack 8 and thus for the guide element 3 or 3', which is coupled with the gear rack 8.

To reduce wear on the adjustment element 5 and on its transmissions 18 as far as possible, the input means 30 and the transmission means 32 are formed from different materials. In the present instance, the input means 30 is made of metal and the transmission means 32 is made of a synthetic material. If lubrication is necessary, a lubricant can be applied to the gear rack 8 and the lubricant can then enter the casing 27 with the forward and return stroke movement of the gear rack 8.

In order to further increase sensitivity, output means formed by the rotating gear wheel, which is concealed by the transmission means 32 in the present instance and which is torque-proofly seated on the shaft 35 together with the transmission means 32, can have a smaller number of teeth than the input means 30. Since the output means designed as gear wheel and the transmission means 32 are torque-proofly seated on the shaft 35, the output means designed as gear wheel and the transmission means 32 may have an identical rotational frequency.

It is furthermore discernible in FIG. 7 that the first part 29 of the casing 27 possesses several grooves (with two grooves being discernible in the present instance) and that the second part of the casing 27 possesses several correspondingly formed projections 37, which insert form-lockingly into the grooves. In this manner it is possible to create a mating alignment when placing the two casing halves 29 and 29' onto each other.

The two casing halves 29 and 29' each possess two bearing rings wherein a respectively first bearing ring of the casing halves 29 and 29' is provided for rotatably bearing the input means 30 and a respectively second bearing ring of the casing halves is provided for rotatably bearing the shaft 35 with transmission means 32 and the output means designed as gear wheel. If the casing 27 is made of a synthetic material, the bearings can be formed as a part of the casing 27 and can be produced in an injection molding process together with the casing 27.

The input means 30 furthermore possesses an aperture 40, through which an actuating link 7 or a shaft 9 or a cardan shaft 21 form-lockingly inserts and rotatingly moves the input means 30. The square profile of the aperture in FIG. 7 should be understood to be exemplary; in other embodiment forms other profiles, for instance polygon or elliptical profiles, may be employed for the form-locking reception of the respective actuating link 7.

The casing 27 also possesses several apertures, which are not discernible in FIG. 7, through which a liquid medium can be discharged from the inside of the casing 27 to the outside. Such a discharge of liquids from the casing 27 can be desirable for preventing corrosion of the transmissions 18, in particular after cleaning procedures.

It should finally be noted that the invention has been described with reference to preferred embodiment forms. Those skilled in the art will appreciate that numerous changes and modifications can be made to the preferred embodiments of the invention within the respectively applicable claims and that such changes and modifications can be made without departing from the spirit of the invention. It is, therefore, intended that the appended claims cover all such equivalent variations as fall within the true spirit and scope of the invention.

LIST OF REFERENCE CHARACTERS

1 Transport section
3 Guide element
5 Adjustment element
6 Transport support surface
7 Actuating link
8 Gear rack
9 Shaft
10 Machine frame
12 Partition wall
13 Distance piece
14 Support arm
15 Bottle
16 Support shoe
17 Can
18 Transmission
19 Supporting leg
21 Cardan shaft
23 Groove
25 Wall section
27 Casing
28 Screw connections
29 Casing half
30 Input means
32 Output means
35 Shaft
37 Projection
40 Aperture
L Longitudinal slot
S Gap
Z Gear teeth

What is claimed is:

1. A transport section of a horizontal conveyor device for conveying articles, comprising:
   a transport support surface, the articles moved along in a standing or hanging position on the transport support surface extending in a horizontal conveying direction between two guide elements arranged approximately in parallel to each other and spaced from each other at a distance corresponding to at least the article or container width, wherein at least one of the two guide elements arranged facing each other is adjustable in its distance to the other of the guide elements and transverse to the conveying direction via several adjustment elements attached to a machine frame or base frame, the adjustment elements coupled with each other via a common rotary drive and being approximately synchronized, wherein each adjustment element transmits a rotatory drive of the common rotary drive via one or more transmissions to a linear adjustment movement of the guide element linked to the adjustment element;

wherein at least one input with external teeth and a first number of teeth n1, said input being coupled with and rotatably drivable by the rotary drive, and at least one transmission device with external teeth and a second number of teeth n2, said transmission device being arranged downstream of the input and designed to intermesh comb-like with the input, wherein the transmission device has a second number of teeth n2 that is at least 1.5 times the number of teeth n1 of the input.

2. The transport section as recited in claim 1 wherein the adjustment elements each comprise at least one gear rack and the transmissions each possess at least one output designed as rotary gear wheel, the output intermeshing toward the linear adjustment movement of the gear rack in a comb-like engagement with the gear rack.

3. The transport section as recited in claim 1 wherein the adjustment elements each comprise at least one gear rack and the transmissions each possess at least one output designed as rotary gear wheel, the output intermeshing toward the linear adjustment movement of the gear rack in a comb-like engagement with the gear rack and wherein the output designed as a rotary gear wheel and a transmission device are coupled with each other in a torque-proof connection and comprise a common rotation axis.

4. The transport section as recited in claim 3 wherein the at least one output designed as rotary gear wheel comprises a third number of teeth n3, with n3 being smaller than the number of teeth n1 of the input.

5. The transport section as recited in claim 1 wherein the adjustment element each comprise a casing formed of at least first and second parts for fully accommodating the transmissions and wherein the respective first part of the casing possesses one or more grooves and the respective second part of the casing comprises one or more projections formed to correspond to the grooves and to engage with the grooves of the respective first part when the first and second parts are connected.

6. The transport section as recited in claim 5 wherein the projections engage form-lockingly with the grooves.

7. The transport section as recited in claim 5 wherein the casing comprises at least one bearing for the input or the transmission or a gear rack or an output designed as a gear wheel.

8. The transport section as recited in claim 5 wherein the casing possesses one or more openings on an underside, a liquid medium dischargable through the openings from an inside of the casing to an outside.

9. The transport section as recited in claim 1 wherein a common and rotating actuating link brings all adjustment elements provided for adjusting the respective guide element into an operative connection with the respective rotary drive.

10. The transport section as recited in claim 9 wherein the actuating link is formed by several cardan shafts and wherein each of the adjustment elements is associated with an own cardan shaft and respectively adjacent cardan shafts are torque-proofly coupled with each other.

11. The transport section as recited in claim 1 wherein the at least one adjustable guide element describes a curved path and is designed to be flexible and wherein on changing the distance to the other guide element the radius of the curved path is adjustable by the respective several adjustment elements by an elastic deformation of the flexible guide element.

12. The transport section as recited in claim 1 wherein the linear adjustment movement of the respective adjustment element is transmittable to or transmitted to respectively one associated support shoe coupled with the guide element, each support shoe comprising a contact surface brought to abut on the guide element and at least approximately following the path of the guide element.

13. The transport section as recited in claim 12 wherein the at least one adjustable guide element comprises a groove, into which the respective support shoe is inserted for shiftable support of the guide elements.

14. The transport section as recited in claim 1 wherein both of the two approximately parallelly arranged guide elements are each adjustable in transverse to the conveying direction in their respective distance to the other of the guide elements by several adjustment elements.

15. The transport section as recited in claim 1 whereon the conveying articles are liquid containers or bottles.

16. A transport section of a horizontal conveyor device for conveying articles, comprising:

a transport support surface, the articles moved along in a standing or hanging position on the transport support surface extending in a horizontal conveying direction between two guide elements arranged approximately in parallel to each other and spaced from each other at a distance corresponding to at least the article or container width, wherein at least one of the two guide elements arranged facing each other is adjustable in its distance to the other of the guide elements and transverse to the conveying direction via several adjustment elements attached to a machine frame or base frame, the adjustment elements coupled with each other via a common rotary drive and being approximately synchronized, wherein each adjustment element transmits a rotatory drive of the common rotary drive via one or more transmissions to a linear adjustment movement of the guide element linked to the adjustment element;

wherein the adjustment elements each comprise at least one gear rack and the transmissions each possess at least one output designed as rotary gear wheel, the output intermeshing toward the linear adjustment movement of the gear rack in a comb-like engagement with the gear rack.

* * * * *